(12) United States Patent
Porikli

(10) Patent No.: US 7,263,472 B2
(45) Date of Patent: Aug. 28, 2007

(54) HIDDEN MARKOV MODEL BASED OBJECT TRACKING AND SIMILARITY METRICS

(75) Inventor: Fatih M. Porikli, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 406 days.

(21) Appl. No.: 10/878,941

(22) Filed: Jun. 28, 2004

(65) Prior Publication Data

US 2005/0288911 A1    Dec. 29, 2005

(51) Int. Cl.
*G06K 7/60*    (2006.01)
*G06K 9/00*    (2006.01)

(52) U.S. Cl. ................. 703/2; 382/103; 382/107
(58) Field of Classification Search ............. 703/2
See application file for complete search history.

(56) References Cited

U.S. PATENT DOCUMENTS

| 6,304,674 | B1* | 10/2001 | Cass et al. | 382/224 |
| 6,754,389 | B1* | 6/2004 | Dimitrova et al. | 382/224 |
| 2003/0058341 | A1* | 3/2003 | Brodsky et al. | 348/169 |
| 2004/0131254 | A1* | 7/2004 | Liang et al. | 382/181 |

OTHER PUBLICATIONS

Narada Dilp Warakagoda and Norges Tekniske Høgskole, "A Hybrid ANN-HMM ASR system with NN based adaptive preprocessing" May 10, 1996. "Definition of Hidden Markov Model" pp. 1-3□□.*

D.G. Elliman and P.J. Connor, "Orientation and Scale Invariant Symbol Recognition Using a Hidden Markov Model", Apr. 7-9, 1992 pp. 331-334.*

C. Jaynes, S. Webb, R. Steele, and Q. Xiong. An open development environment for evaluation of video surveillance systems. *Proc. of PETS*, Copenhagen, Denmark, Jun. 2002.

M. Harville. Stereo person tracking with adaptive plan-view statistical templates. *Hawaii Int. Conf. on System Sciences*, p. 746755, 1993.

C. Needham and R. Boyle. Performance evaluation metrics and statistics for positional tracker evaluation. *Third International Conference of Computer Vision Systems*, pp. 278-289, Graz, Austria, Apr. 2003.

A. Senior, A. Hampapur, Y. Tian, L. Brown, S. Pankanti, and R. Bolle. Appearance models for occlusion handling. *Proc. of PETS*, Hawaii, Kauai, Dec. 2001.

T. Ellis. Performance metrics and methods for tracking in surveillance. *Proc. of PETS*, Copenhagen, Denmark, Jun. 2002.

F. Porikli and O. Tuzel. Human Body Tracking by Adaptive Background Models and Mean-Shift Analysis. *Proc. of PETS*, Graz, Austria, Apr. 2003.

* cited by examiner

*Primary Examiner*—David Vincent
*Assistant Examiner*—Ben Rifkin
(74) *Attorney, Agent, or Firm*—Dirk Brinkman; Clifton D. Mueller; Gene V. Vinokur

(57) ABSTRACT

A method models a set of trajectories of a set of objects; there is one trajectory for each object. A sequence of positions of each object is obtained over a duration of time to define a trajectory of the object. The sequence of positions is then projected to a hidden Markov model to model the trajectory of each object.

22 Claims, 8 Drawing Sheets

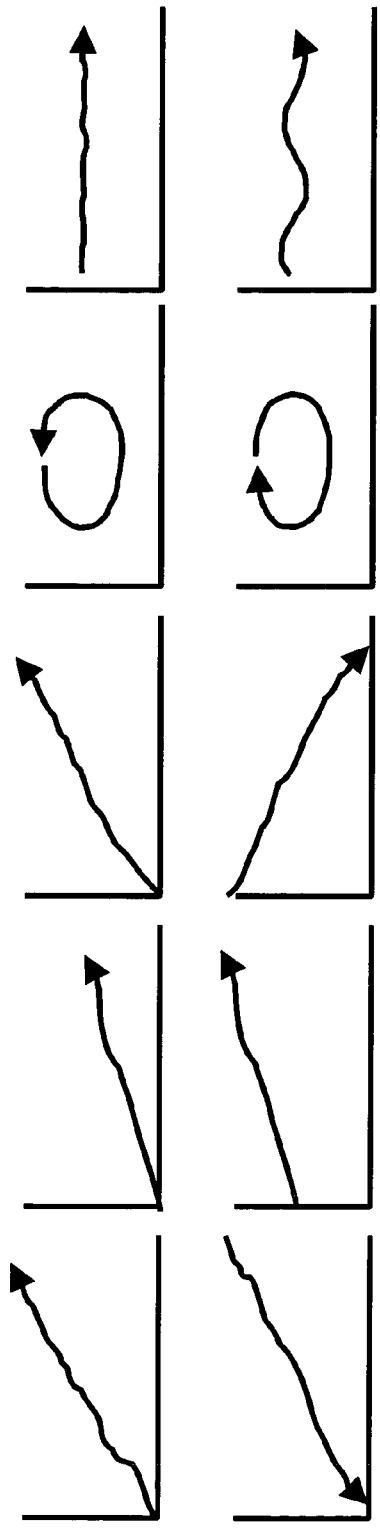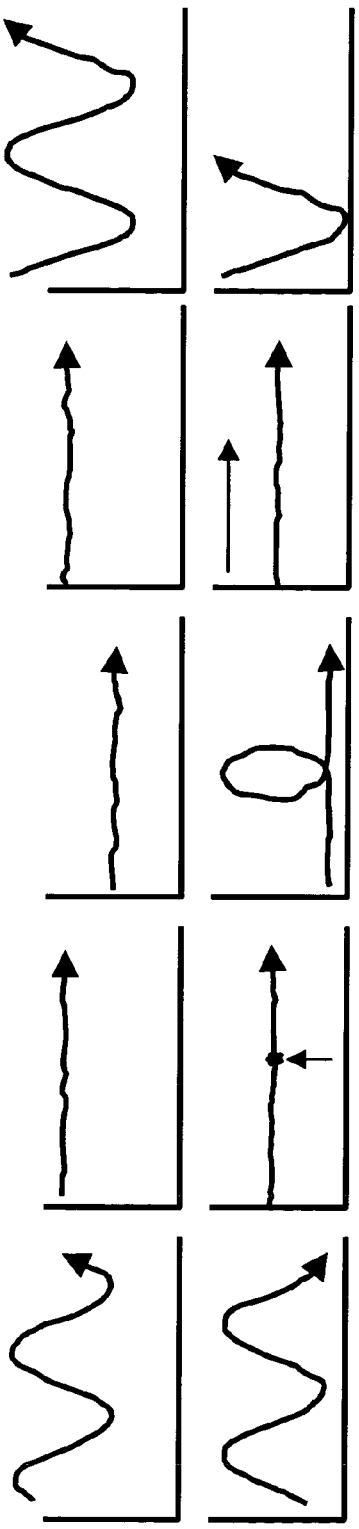

| | $m_8$ | $m_9$ | $m_{10}$ | $m_1$ | $m_2$ | $m_3$ | $m_4$ | $m_5$ | $m_6$ | $m_7$ |
|---|---|---|---|---|---|---|---|---|---|---|
| Opposite (ED) | 0.123 | 1.000 | 0.001 | 1.000 | 1.000 | 1.000 | 0.055 | 1.000 | 1.000 | 0.001 |
| Translation (ED) | 0.356 | 0.001 | 0.006 | 0.283 | 0.001 | 0.287 | 1.000 | 0.148 | 0.002 | 0.573 |
| Crossing (ED) | 1.000 | 0.370 | 0.002 | 0.707 | 0.502 | 0.721 | 0.016 | 0.707 | 0.677 | 1.000 |
| Circling (ED) | 0.008 | 0.105 | 0.000 | 0.449 | 0.143 | 0.491 | 0.000 | 0.355 | 0.403 | 0.000 |
| Perturbation (ED) | 0.001 | 0.027 | 0.012 | 0.017 | 0.000 | 0.018 | 0.001 | 0.014 | 0.417 | 0.139 |
| Phase shift (ED) | 0.073 | 0.001 | 0.002 | 0.107 | 0.008 | 0.123 | 0.029 | 0.085 | 0.020 | 0.226 |
| Wait (VD) | 0.069 | 0.071 | 0.316 | . | . | . | . | . | . | 0.001 |
| Loop (VD) | 0.389 | 0.529 | 0.775 | . | . | . | . | . | . | 0.001 |
| Speed up (VD) | 0.001 | 0.214 | 1.000 | . | . | . | . | . | . | 0.003 |
| Partial (VD) | 0.198 | 0.001 | 0.002 | . | . | . | . | . | . | 0.000 |

*FIG. 7*

HIDDEN MARKOV MODEL BASED OBJECT TRACKING AND SIMILARITY METRICS

RELATED APPLICATIONS

This Patent Application is related to U.S. patent application Ser. No. 10/878,958, "Usual Event Detection in a Video Using Object and Frame Features," filed by Porikli herewith and incorporated herein by reference, and U.S. patent application Ser. No. 10/878,943, "Unusual Event Detection in a Video Using Object and Frame Features," filed by Porikli herewith and incorporated herein by reference.

FIELD OF THE INVENTION

This invention relates generally to processing videos, and more particularly to tracking multiple objects in videos to determine similarity of trajectories of the objects.

BACKGROUND OF THE INVENTION

Newer video coding standards, such as MPEG-4, allow arbitrary-shaped objects to be encoded and decoded as separate video object planes (VOPs). These emerging standards are intended to enable multimedia applications, such as interactive video, where access is universal, and where natural and synthetic objects are integrated. For example, one might want to "cut-and-paste" moving persons from one video to another. In order to identify the persons, the persons must first be tracked.

A VOP describes a video object in terms of, for example, shape, motion, and texture. The exact method of producing the VOP from the source images is not defined by the standards. It is assumed that "natural" objects are represented by shape information, in addition to the usual luminance and chrominance components. Because video objects vary extensively with respect to low-level features, such as, optical flow, color, and intensity, object tracking is a very difficult problem.

Recent advances in object tracking make it possible to obtain spatio-temporal motion trajectories of moving object for further analysis of concealed information. Although the extraction of trajectories is well known, precise comparison of the extracted trajectories and secondary outputs of the tracking process is not well understood.

A key issue in evaluating results of object tracking, i.e., the object trajectories, is a metric that determines a similarity of the trajectories. Any additional analysis, such as action recognition and event detection, depends highly on an accuracy of the similarity assessment.

Most prior art similarity metrics determine a mean distance of the corresponding positions of two equal duration trajectories, C. Jaynes, S. Webb, R. Steele, and Q. Xiong, "An open development environment for evaluation of video surveillance systems," *Proc. of PETS*, June 2002, and A. Senior, A. Hampapur, Y. Tian, L. Brown, S. Pankanti, and R. Bolle. "Appearance models for occlusion handling," *Proc. of PETS*, December 2001. These are strictly 'distance' metrics.

Supplementary statistics such as variance, median, minimum, and maximum distances are also known to extend the description of similarity.

An alignment based metric reveals a spatial translation and a temporal shift between given trajectories, C. Needham and R. Boyle. "Performance evaluation metrics and statistics for positional tracker evaluation," *Third International Conference of Computer Vision Systems*, pages 278-289, April 2003. That method uses an area based metric that measures a total enclosed area between the trajectories using trajectory intersections.

Other statistical properties of the tracking performance use compensated means and standard deviations, T. Ellis, "Performance metrics and methods for tracking in surveillance," *Proc. of PETS*, June 2002.

One main disadvantage of the prior art methods are that those methods are all limited to equal duration (lifetime) trajectories. This means that the number of coordinates that constitute the trajectories are equal.

Typically, the coordinates are sampled at different time instances. Because the conventional similarity metrics depend on mutual coordinate correspondences, those metrics cannot be applied to trajectories that have unequal or varying durations unless the trajectory duration is first normalized or parameterized. However, such a normalization destroys the temporal properties of the trajectories.

Conventional similarity metrics assume that the temporal sampling rates of the trajectories are equal. For instance, a ground truth trajectory labeled at a certain frame rate can be compared only with the trajectory generated by a tracker working at the identical frame rate. Those methods cannot handle uneven sampling instances, i.e., varying temporal distance between the coordinates.

This is a common case, especially for the real-time object trackers that process streaming video data. A real-time tracker works on the next available frame, which may not be the immediate temporal successor of the current frame, whenever the current frame is processed. Thus, the trajectory coordinates obtained have varying temporal distances.

Therefore, there is a need for a method for tracking multiple objects in videos that overcomes the problems of the prior art. Furthermore, there is a need for similarity metrics that can compare a wide variety of trajectory patterns.

SUMMARY OF THE INVENTION

The invention provides a method for tracking objects in a video. The invention also provides a set of similarity metrics to compare multiple trajectories. These similarity metrics enable the comparison of trajectories without the limitations of conventional metrics. The similarity metrics according to the invention accurately identify coordinates, orientation, and speed affinities of the trajectories.

In the method according to the invention, the trajectories are represented by hidden Markov models (HMM). The proposed HMM based set of similarity metrics can be used for ground truth comparisons, and clustering. The method according to the invention has superior discriminative properties when compared with prior art tracking methods.

BRIEF DESCRIPTION OF THE DRAWINGS

FIGS. 6A-J are diagrams of trajectories modeled according to the invention;

FIG. 7 is a table comparing similarity metrics for the trajectories of FIGS. 6A-J.

DETAILED DESCRIPTION OF THE PREFERRED EMBODIMENT

Figure 1:
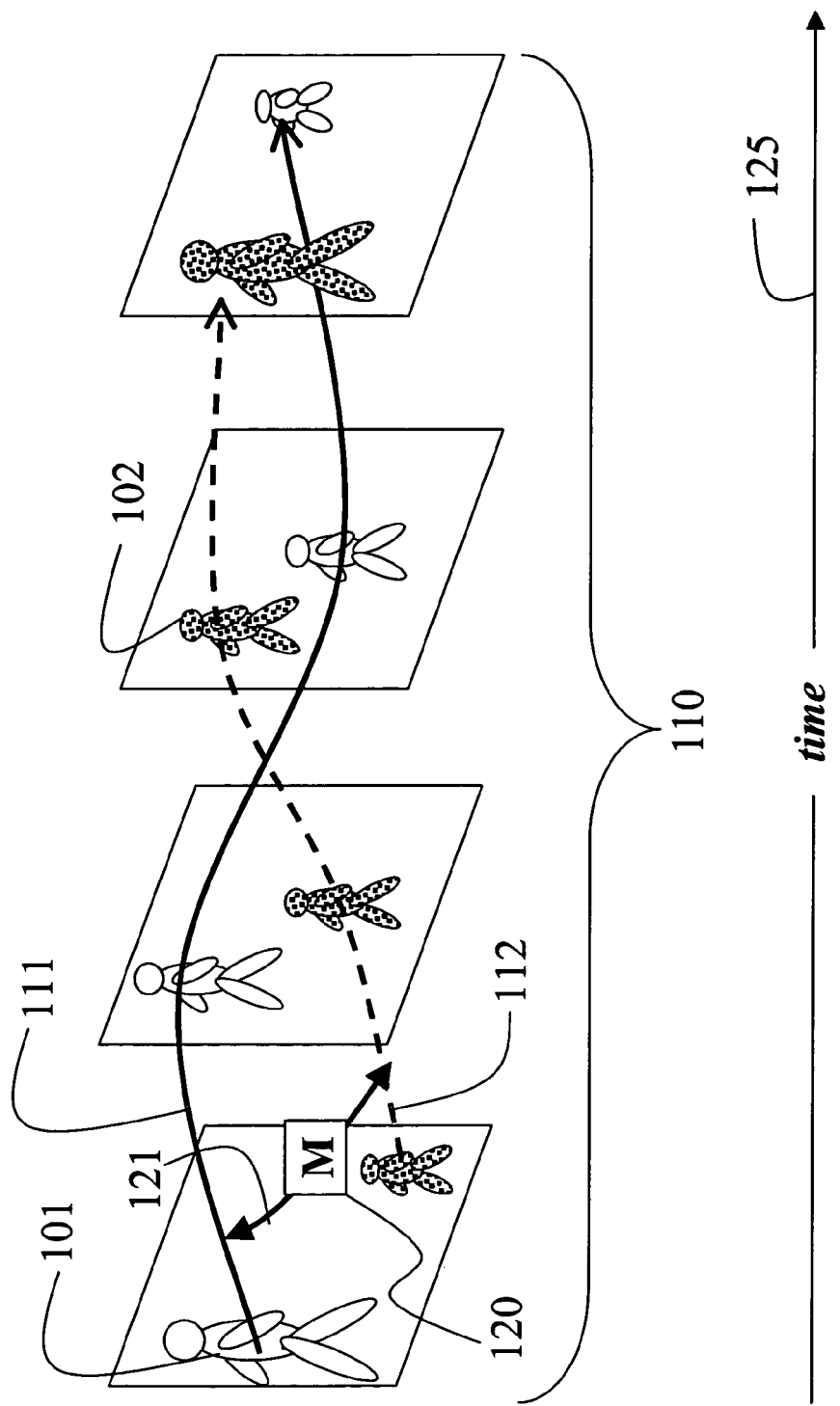
FIG. 1 is a block diagram of moving trajectories of moving objects in frames of a video.

As shown in FIG. 1, the invention provides a method for tracking multiple objects 101-102 in a temporal sequence of frames 110, i.e., a video, to determine corresponding trajectories 111-112 of the objects. The invention also provides a set of similarity metrics (M) 120 to compare 121 the trajectories over time 125.

As shown, the trajectories of the two objects in the video 110 cross. In addition, as indicated by the relative sizes of the objects, one object 101 is receding into the background, while the other object 102 is approaching the camera. Such trajectories are not handled well, if at all, by prior art tracking methods.

Figure 2:
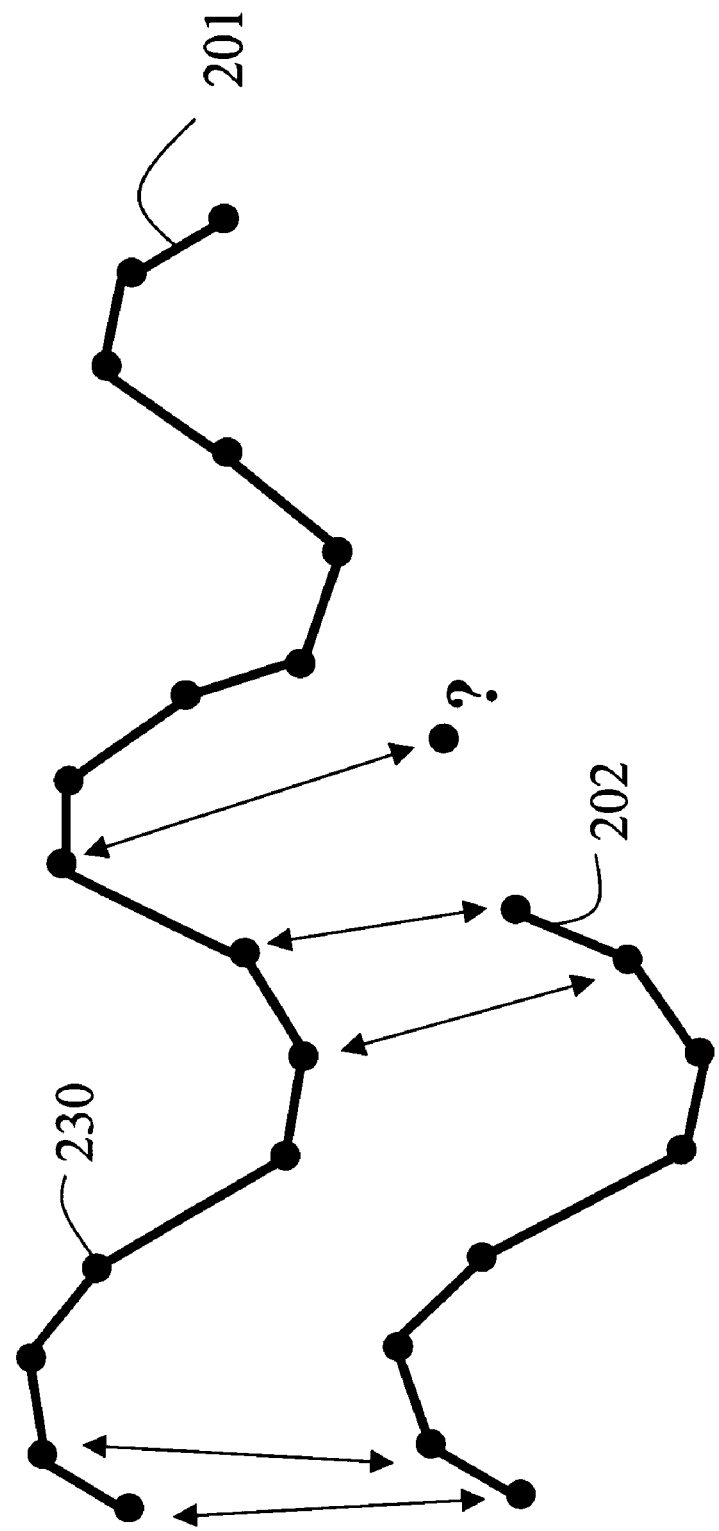
FIG. 2 is a diagram of two trajectories of unequal duration.
Figure 3:
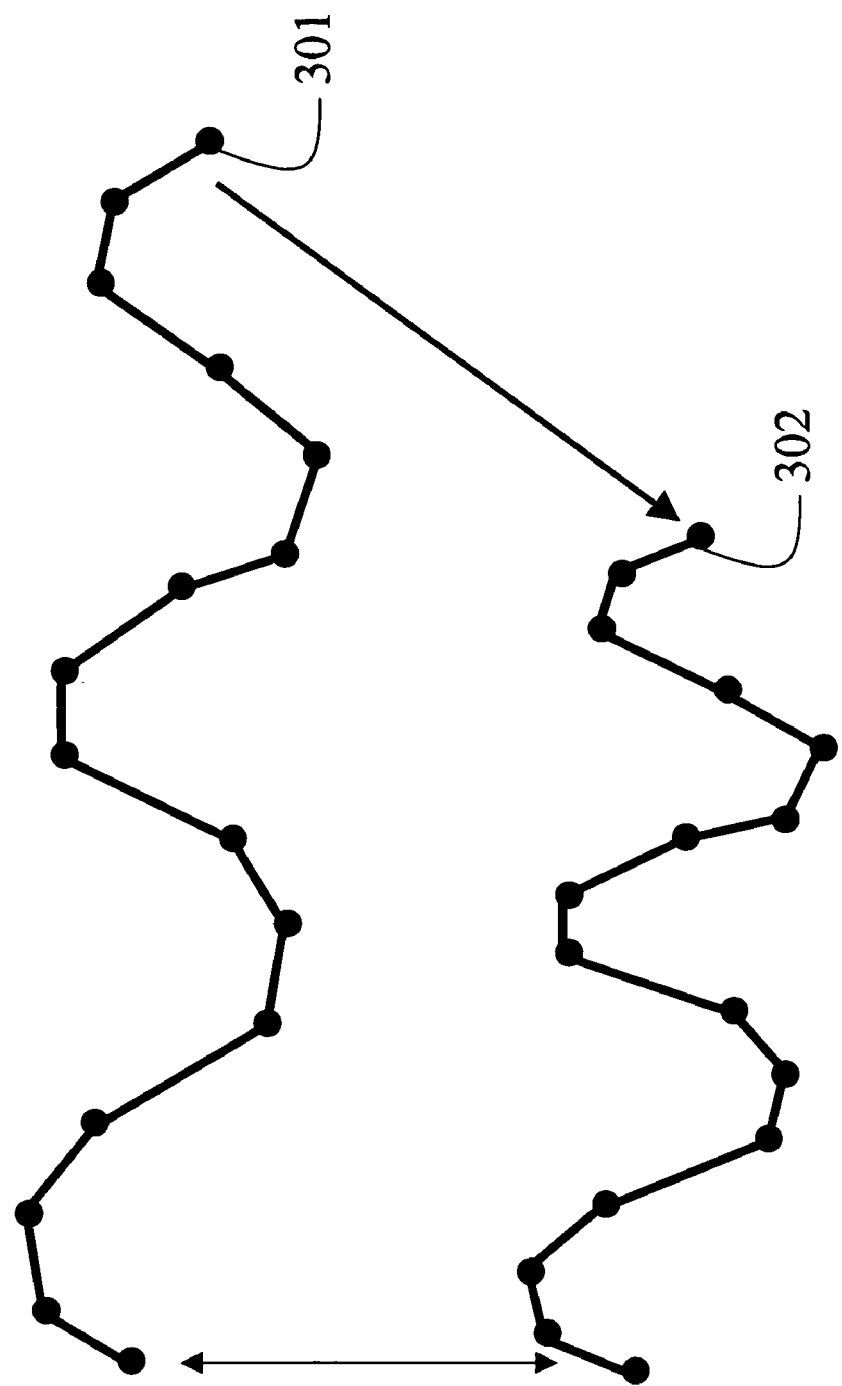
FIG. 3 is a diagram of two trajectories with unequal sampling rates.

FIGS. 2 and 3 show additional ambiguous trajectories that cannot be compared using conventional similarity metrics, but that can be compared with the set of similarity metrics according to the invention. In FIG. 2, the ambiguous trajectories 201 and 202 have unequal durations, and the trajectories 301 and 302 in FIG. 3 have equal durations but different frame rates, i.e., sampling rates.

Trajectory Distance Measures

Each trajectory is a time sequence of coordinates 230 representing motion of an object along a path in a video as long as the object is visible in the video. That is, the trajectory extends through all frames of the video that include the object.

Although the example application used to describe the various embodiments of the invention tracks an object in a video, it should be understood that object tracks can be obtained by other means, such as laser range scanners, radar, GPS, sonar, microphone arrays, infrared sensors, motion sensors, and active transmission.

For a video application, the time sequence of coordinates corresponds to marked positions of a shape of the object in consecutive frames. For a pixel based model, the marked positions generally indicate a center-of-mass of the object. For an ellipsoid model, the marked positions indicate an intersection of main diagonals. For a bounding box model, the positions indicate an average of a minimum and a maximum on perpendicular axes of a region enclosing the object. Therefore, it is possible to view the trajectory as a collection of frame-wise abstractions of object shape.

In the following description, the following notation is used $$T: \{p_n\}: \{(x_1, y_1, t_1), (x_2, y_2, t_2), \ldots, (x_N, y_N, t_N)\},$$

where T is a trajectory, p is an $n^{th}$ position of the object, (x, y, t), are the coordinates of the position, with x and y being the position in each frame t over time, and N is a duration of the trajectory.

Again, as stated above, the coordinates of the positions of the object over time can be obtained by any known technique. It should also be noted that in general positions of the object over time can be indicated in three dimensions with an additional z coordinate.

A simple similarity metric $m_1$ for determining a distance between a pair of trajectories $T^a$ and $T^b$ is a mean of coordinate distances, which is given as $$m_1(T^a, T^b) = 1/N \sum_{N}^{n=1} d_n^2 \quad (1)$$

where a displacement d between the positions is measured using a Cartesian distance $$d_n^2 = [(x_n^a - x_n^b)^2 - (y_n^a - y_n^b)^2]^{1/2}, \quad (2)$$

or a L-norm formulation $$d_n^L = [(x_n^a - x_n^b)^L - (y_n^a - y_n^b)^L]^{1/L}. \quad (3)$$

The mean similarity metric makes three critical assumptions: the durations of both trajectories are same $N^a = N^b = N$; the coordinates of the positions are synchronized $t^a_n = t^b_n$; and the rate of sampling, i.e., the frame rate is constant $t^a_n - t^a_{n+1} = t^a_m - t^a_{m+1}$. It is self evident that the mean of distances is very sensitive to partial mismatches and cannot deal with distortions in time.

To provide more descriptive information, second order statistics, such as median, variance, minimum and maximum distance, can be incorporated. A variance metric $m_2$ is defined as $$m_2(T^a, T^b) = 1/N \sum_{n=1}^{N} (d_{en} - m_1(T_a, T_b))^2 \quad (4)$$

For a median metric $m_3$, the displacements $d_n$ are ordered with respect to their magnitudes as $d_n \to d_m$. Then the value of the halfway component of the list is assigned $$m_3(T^a, T^b) = \begin{cases} d_{\frac{N+1}{2}} & N \text{ odd} \\ \frac{1}{2}\left(d_{\frac{N}{2}} + d_{\frac{N+1}{2}}\right) & N \text{ even} \end{cases}$$

Minimum and maximum distances metrics $m_4$ and $m_5$ are defined as $$m_4(T^a, T^b) = \min d_n, \text{ and} \quad (5)$$

$$m^5(T^a, T^b) = \max d_n. \quad (6)$$

Although these metrics supply extra information, these metrics inherit, or even amplify, the shortcomings of the distances metric $m_1$. Besides, none of the above metrics is sufficient enough by itself to make an accurate assessment of the similarity of any arbitrary pair or trajectories.

An area based metric $m_6$ is can also be used. There, crossing positions q: $T^a(p_i) = T_b(p_j)$ of two paths define regions $Q_j$ j=1, . . . , J between the pair of trajectories. For each region, a polygon model is generated and an enclosed area is found by tracing a parameterized shape $$m_6(T^a, T^b) = \sum_{j=1}^{J} \text{area}(Q_j) \quad (7)$$

The area based metric can handle more complex trajectories, however it is sensitive to entanglements of the trajectories. The metric discards time continuities, and fails to distinguish two trajectories in opposite directions.

Although the area between a pair of trajectories can be identified, the exact extent of the area can demand different analytic solutions, and is not always straightforward to formulate.

A spatio-temporal alignment of coordinate differences, or delta values ($\delta x$, $\delta y$, $\delta t$), for which the mean distance is minimized, can be determined according to $$(\delta x, \delta y, \delta t) = \text{argmin } m_1(T^a, T^b + (\delta x, \delta y, \delta t)) \quad (8)$$

and this alignment can be used to determine a compensated similarity metric $$m_7(T^a, T^b) = m_1(T^a, T^b + (\delta x, \delta y, \delta t)). \quad (9)$$

Statistical measures such as true detection rate, and false alarm rate, which use the aligned trajectories for comparison with the ground truth are also known.

However, not all trajectory distance tasks involve ground truth comparison, i.e., clustering.

Trajectory Based Features

A temporal sequence of coordinates is not the only available feature of a trajectory. In spite of its simplicity, the duration of the trajectory is also a distinctive feature of unusual events. For instance, in a surveillance application, a stationary unattended bag can be distinguished easily from a person because people do not tend to stand perfectly still for extended periods of time.

A total length of the trajectory is defined as $\Sigma_{n=2}^{N}|T(p_n) - T(p_{n-1})|$. This is different from a total displacement of the object, which is equal to $|T(p_N) - T(p_1)|$. If a ground plane of the camera system is available, then the trajectory can be projected to obtain a perspective 3D length. A total orientation descriptor maintains a global direction of the object.

Depending on the camera setup, trajectory duration related metrics can be used to differentiate unusual paths. A ratio length/duration of the trajectory gives the average speed of the object.

Dynamic properties of an object, such as orientation, aspect ratio, size, instantaneous speed, and location can be represented by histograms. The location histogram keeps track of the image coordinates of the object. Using the size histogram, dynamic properties of the object size can be extracted, e.g., an object moving towards the camera can be distinguished from another object moving parallel to the camera, assuming the size of the objects increases as the object moves towards the camera.

As an object moves at different speeds during tracking, an instantaneous speed of the object can be accumulated into a histogram. Speed is a key aspect of some unusual events, e.g., a person running through a crowd of pedestrians. The speed histogram can be used to interpret irregularity of movement, such as erratically moving objects.

If the objects in the video are vehicles, then a road accident can be detected using the speed histogram because the histogram accumulates both high speed and zero speed components, rather then having the speed components distributed smoothly.

An orientation histogram is another important trajectory descriptor. For instance, it is possible to distinguish objects moving on a circular or curved trajectory. This makes it possible to locate a vehicle backing up in a wrong lane, turning, and then driving correctly again, which may not be detected using a global orientation.

An aspect ratio is a good descriptor to distinguish between human objects and vehicles. An aspect ratio histogram can determine whether a person is lying down, crouching, or standing up.

Hidden Markov Model Based Object Tracking and Similarity Metrics

Due to the shortcomings of the prior art object tracking and similarity metrics, the invention uses a model that captures dynamic properties of trajectories.

The model according to the invention represents a trajectory of duration N of an object as a M-mixture of K-state continuous hidden Markov models (HMM). The dynamic properties of the trajectories are captured within a state transition matrix of the HMM. A HMM based set of similarity metrics enables the comparison of trajectories without any of the limitations of the prior art similarity metrics.

The set of similarity metrics according to the invention can be used for ground truth comparisons and for clustering. The set of similarity metrics can also be used to compare and distinguish trajectories that have different durations, sampling rates, and temporal properties. The method accurately identifies coordinates, orientations, and speed affinities of objects.

The method can also extract additional features from the trajectories, such as object-wise histograms of aspect-ratio, location, orientation, speed, and size, to improve the available features.

Hidden Markov Model

Figure 8:
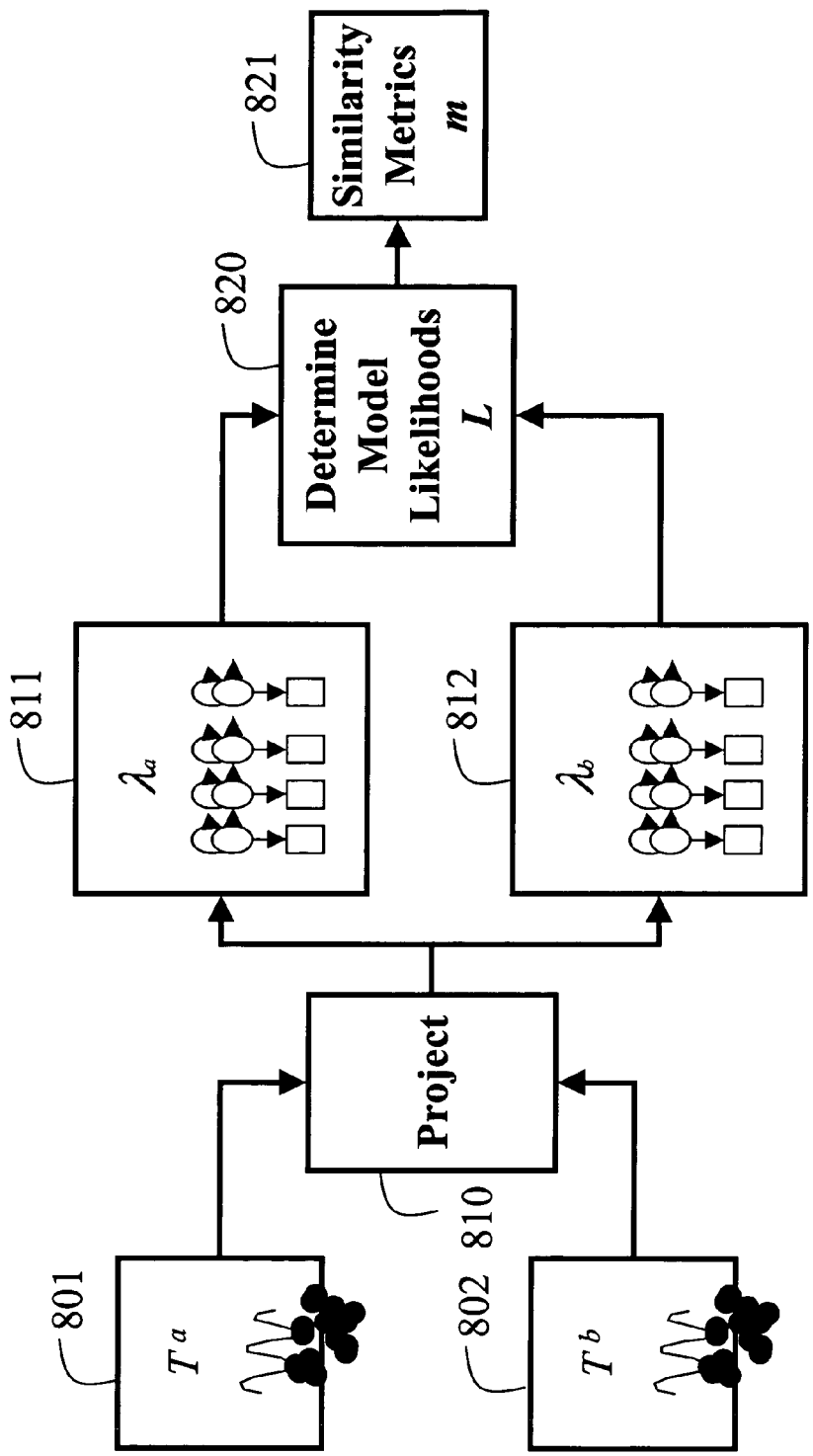
FIG. 8 is a block diagram of a method according to the invention.

As shown in FIG. 8, each trajectory T 801-802 is projected 810 into a corresponding parameter space $\lambda$. The parameter space $\lambda$ is characterized by a set of parameters $\pi$, B, $\mu$, $\Sigma$ of a hidden Markov model (HMM), i.e., $$\lambda = (\pi, B, \mu, \Sigma), \text{ were}$$

$\pi$ is a set of prior probabilities of states of the model,
B is a set of state transition probabilities of the states,
$\mu$ is a set of means of the states, and
$\Sigma$ is a set of covariance values of the states.

Figure 4:
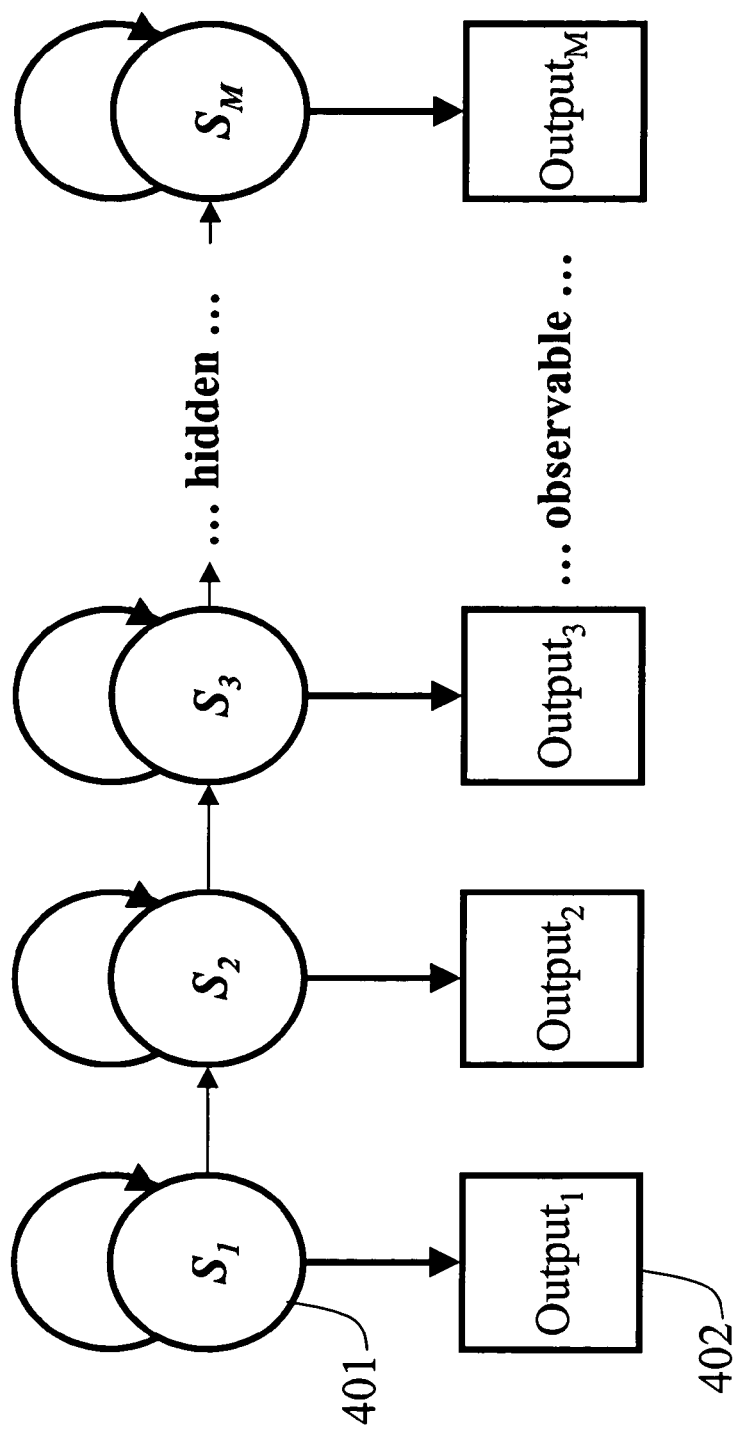
FIG. 4 is a block diagram of a hidden Markov model according to the invention.

As shown in FIG. 4, the HMMs 811-812 are probabilistic models composed of a number of interconnected states, and a directed graph. Each state emits an observable output symbol. Each state is characterized by two probability distributions: a transition probability distribution over states, and an emission probability distribution over the output symbols.

A random signal source described by such a model generates a sequence of output symbols as follows. At each time step t, the source is in a current state, and after emitting an output symbol according to the emission distribution of the current state, the source transitions to a next state according to the transition distribution of the current state.

Because activities of the source are observed indirectly, through the sequence of output symbols, and the sequence of states is not directly observable, the states are said to be hidden.

According to the invention, the trajectory information is represented as the emitted observable output for the directed graph. Then, the hidden states capture the transitive properties of the consecutive coordinates of the spatio-temporal trajectory. The state sequence that maximizes the probability becomes the corresponding model for the given trajectory.

A simple specification of a K-state $\{S_1, S_2, \ldots, S_K\}$ continuous HMM with a Gaussian observation is given by: a set of prior probabilities $\pi = \{\pi_i\}$, where $\pi_i = P(q_1 = S_i)$ and $1 \leq i \leq K$; a set of state transition probabilities $B = \{b_{ij}\}$, where $b_{ij} = P(q_{t+1} = S_j | q_t = S_i)$ and $1 \leq i, j \leq K$; and mean, variance and weights of mixture models $N(O_t, \mu_j, \sigma_j)$, where $\mu_j$, $\sigma_j$ are the mean and covariance of the state j, and $q_t$ and $O_t$ are respectively the state and observation at time t.

An M-mixture, K-state HMM, $\lambda = (\pi, B, \mu, \Sigma)$, is fitted to each trajectory T. The HMM has a left-to-right topology using the well-known Baum-Welch process. The left-to-right topology is selected because this topology efficiently describes continuous dynamic processes. Each topology can have, for example, three states and a mixture of three continuous Gaussian probability distributions.

After the state transition and prior probability matrices are initialized with random values for the model parameters, the HMM is trained with trajectory training data. Thus, no prior assumptions are made about the trajectories. The initialization can be adapted for specific applications. Each trajectory is projected 810 to a separate corresponding model.

An optimum number of states and mixtures depends on a complexity and duration of the trajectories. To provide sufficient evidence to every continuous Gaussian probability distribution of every state in the training stage, the duration N of the trajectory is substantially larger than the number of Gaussian mixtures times the number of states, $N \gg M \times K$.

A state represents a basic pattern of the trajectory. Thus, depending on the trajectory, the number of states is large enough to conveniently characterize distinct patterns, but small enough to prevent overfitting.

A priori knowledge about the tracking application can be used to impose a structure on the HMM, as well on the values of the state variables. For example, it may be known a priori that each state is associated with a certain label.

Furthermore, the topology of the HMM can be strongly constrained. That is, a substantial number of transition probabilities are forced to be zero. Because the number of free parameters and the amount of processing are directly dependent on the number of non-zero transition probabilities, imposing such constraints is useful. Furthermore, by imposing the constraints, it may be possible to determine the exact hidden states that the HMM is to represent.

HMM Structure

As shown in FIG. 4, a most basic structure that is imposed on HMM is the left-to-right structure. There, hidden states 401 are ordered sequentially, and transitions proceed from the "left" to the "right", or from current state to consecutive next state, while observable outputs 402 are emitted.

An optimal number of states of the HMM is searched for a given trajectory, while repeating the generation and evaluation of the topology.

At the beginning of the search, possible HMMs up to a maximum number of states, are generated randomly. In general, a likelihood of the HMM increases with the complexity of the topology. However, it is known that overfitting is frequently observed as the complexity increases.

Validity Score

Therefore, in order to balance a likelihood and a complexity, a validity score is determined as $$v_i = [-2 \log L(T; \lambda_i) + 2\sigma_i]^{-1}, \quad (10)$$

where $v_i$ is the validity of the $i^{th}$ HMM, $L(T; \lambda_i) = P(T|\lambda_i)$ is a maximum likelihood, $\sigma$ is a constant balancing factor, and $i=2, \ldots, K_{max}$ is the maximum number of states. Then, the states that are selected to be incorporated into the HMM have the highest validity scores.

HMM Based Similarity Metric

From the HHMs 811-812, a set of similarity metrics 821 can be determined 820 based on likelihoods of the models.

Figure 5:
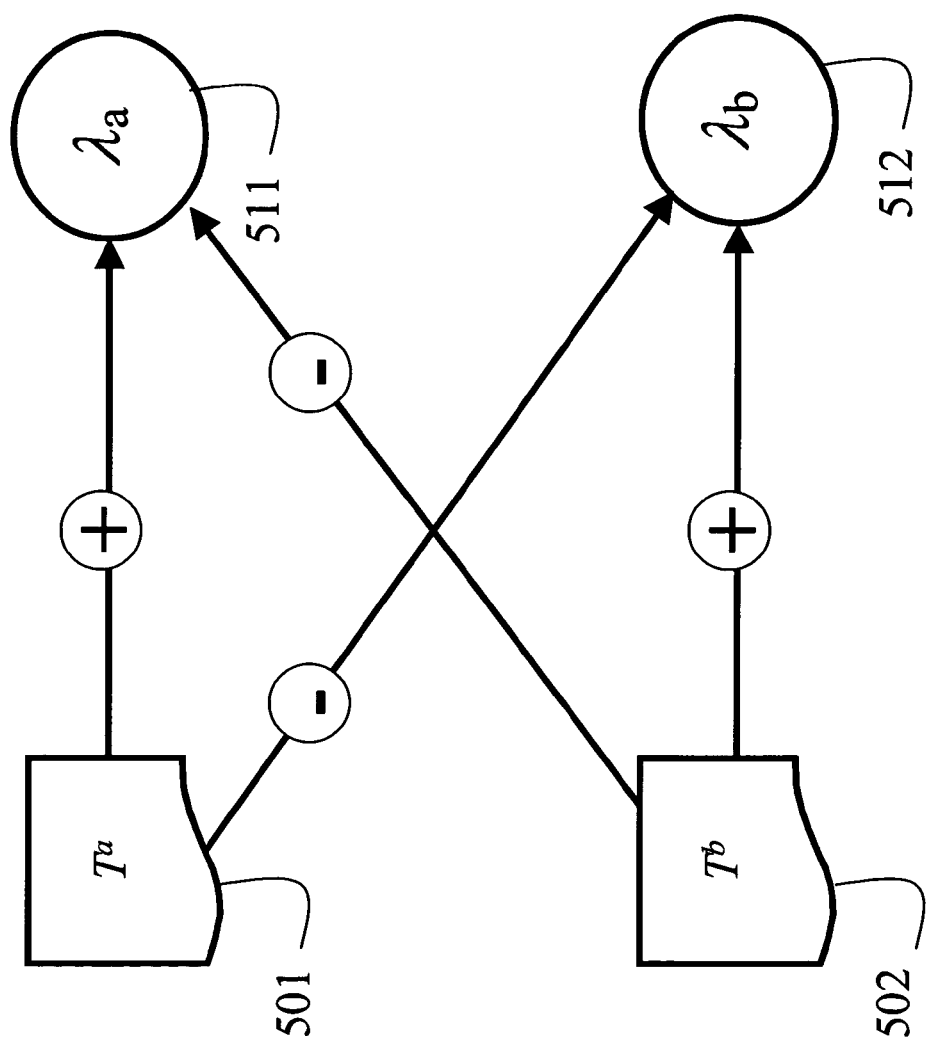
FIG. 5 is a block diagram cross-fitting two hidden Markov models.

As shown in FIG. 5, a similarity metric of two trajectories $T^a$ 501 and $T^b$ 502, in terms of their corresponding HMM parameterizations $\lambda_a$ 511 and $\lambda_b$ 512 is $$m_8(T^a, T^b) = |L(T^a; \lambda_a) + L(T^b; \lambda_b) - L(T^a; \lambda_b) - L(T^b; \lambda_a)|, \quad (11)$$

which corresponds to a cross-fitness of the models of the trajectories. The likelihood $L(T^a; \lambda_a)$, $L(T^b; \lambda_b)$ terms indicate a likelihood of the trajectories to their own fitted model, i.e., a maximum likelihood response for the models is obtained.

The cross terms $L(T^a; \lambda_b)$, $L(T^b; \lambda_a)$ reveal a likelihood of one trajectory generated by the model of the other trajectory. In other words, if two trajectories are identical, the cross terms have a maximum value, thus the similarity metric $m_8$ in Equation (11) is equal to zero. On the other hand, if trajectories are different, their likelihood of being generated from each other's model is small, and the similarity metric is large.

Up to now, the coordinates of the objects have been used as the feature sequences of the trajectories. The coordinates reveal spatial correlation between trajectories. However, in some situations, it is more important to distinguish shape similarity of the trajectories, independent of the spatial coordinates.

Instantaneous speed and orientation sequences are features that can establish shape similarity, even if there is a spatial translation. Thus, two other sequential features and corresponding metrics are defined.

An orientation sequence is defined as $$\phi T(p_n) = \tan^{-1}((y_n - y_{n-1})/(x_n - x_{n-1}))$$

with a corresponding orientation metric $$m_9(T^a, T^b) = m_8(\phi T^a, \phi T^b). \quad (12)$$

A speed sequence is defined as $$\Delta T(p_n) = [(x_n - x_{n-1})^2 + (y_n - y_{n-1})^2]^{1/2}$$

with a corresponding speed medic $$m_{10}(T^a, T^b) = m_8(\Delta T^a, \Delta T^b). \quad (13)$$

The HMM can also be applied to histogram features, such as an orientation histogram, and a speed histogram. However, because these features discard the temporal ordering of the coordinates, these features are more suitable to evaluate statistical properties of trajectories rather than measuring the similarity of the shape and coordinates of the trajectories.

Comparisons

To compare the set of similarity metrics $m_8$, $m_9$, $m_{10}$ according to the invention, and the conventional metrics $m_1$-$m_7$ of the prior art, the metrics for several distinct trajectory pattern pairs are determined, as shown in FIGS. 6A-J. The trajectories of Figures A-F are of equal duration (ED), and the trajectories of Figure G-F are of unequal or variable duration (VD). The FIGS. 6A-J show opposite directions, translation, crossing, opposite circling, oscillating, phase shift, time wait, loop, speed up, and partial trajectories, respectively. Each equal duration trajectory consists of one hundred positions. To make the comparison realistic, random white noise is added to all patterns.

The first set of equal duration trajectory pairs include trajectories that are in the opposite direction FIG. 6A, spatially shifted trajectories FIG. 6B, trajectories that are crossing each other FIG. 6C, trajectories that have the same circling path but in opposite directions FIG. 6D, trajectories where their global orientation is the same but their paths have small perturbations FIG. 6E, and trajectories that are in same form, except with a time shift FIG. 6F.

The second set of trajectory pairs have unequal durations. For instance, FIG. 6G shows a pair that have same spatial path but one of the trajectories has a several frames-long waiting period as shown with an arrow. FIG. 6H shows a pair with the same spatial form except one trajectory has a loop. In FIG. 6I, the bottom trajectory has the same form but its duration is half of the first trajectory due to acceleration as shown by the arrow. In FIG. 6J, a partially matching pair is shown.

After determining the metrics of all pairs for a given metric, the metrics are normalized using a maximum value obtained for that metric. The normalized responses of all metrics are shown in FIG. 7.

A highest score in each column indicates the pattern to which the metric is most sensitive. Note that an ideal metric should be applicable to all diverse patterns regardless of the trajectory duration, frame-rate, and other limitations.

From the table, it is evident that the sum of coordinate distances metric $m_1$, the variance of coordinate distances metric $m_2$, and the median coordinate similarity metric $m_3$ all have similar properties. Their fusion does improve the overall discriminative capability.

The maximum distance metric $m_4$ and the minimum distance $m_5$ are very sensitive to singularities. For instance, the maximum distance metric score can be very high due to the large distance of a single correspondence, even if the trajectories match perfectly otherwise. Similarly, the minimum similarity metric fails for crossings of the trajectories, i.e., it gives zero score for crossing trajectories even if the trajectories completely different.

The spatiotemporal alignment metric $m_6$ is insensitive to shifting; otherwise it is similar to the metric $m_1$. These metrics cannot handle different duration trajectories. The area metric $m_7$ fails for patterns that have the same path but opposite direction. Neither can the area metric distinguish temporal deformations.

On the other hand, the HMM based metrics according to the invention are applicable to trajectories that have different durations. These metrics can successfully identify various temporal deformations including time waiting, partial match, different speed, time loop, and the like.

The coordinate based HMM metric $m_8$ is sensitive towards a spatial positioning of the trajectories, and the metric can identify crossing, translation, phase shift, time loop, partial, and opposite directions.

The orientation based HMM metric $m_9$ is responsive towards the orientation variances, i.e., the metric yields a highest score to opposite direction pattern, and the metric can recognize crossing, time loop, and circling patterns. The speed based HMM metric $m_{10}$ detects speed changes and time loops most effectively, and the metric can identify uneven frame-rates as well.

Because the set of similarity metrics according to the invention are responsive to different patterns, a mixture of the metrics is a perfect candidate to measure similarities of a wide range of arbitrary trajectories.

Effect of the Invention

The invention provides a set of HMM based trajectory similarity metrics that can accurately measure coordinates, orientation, and speed similarity of a pair of trajectories. These metrics measure different duration trajectories without destroying the temporal properties. The metrics can be used not only for ground truth comparisons, but also for further analysis of the tracking results, e.g., clustering and event analysis.

Experiments show that the HMM similarity metrics according to the invention have superior discriminative properties than conventional metrics.

It is to be understood that various other adaptations and modifications can be made within the spirit and scope of the invention. Therefore, it is the object of the appended claims to cover all such variations and modifications as come within the true spirit and scope of the invention.

I claim:

1. A method for modeling a set of trajectories of a set of objects, there being one trajectory for each object, comprising:

obtaining a sequence of positions of each object over a duration of time to define a trajectory of the object, in which the sequence of positions is defined by $T:\{p_n\}:\{(x_1, y_1, t_1), (x_2, y_2, t_2), \ldots, (x_N, y_N, t_N)\}$, where T is the trajectory, $p_n$ is an $n^{th}$ position of the object, (x, y, t), are coordinates of the position, and N is the duration of the trajectory; and projecting each sequence of positions to a corresponding hidden Markov model to model the trajectory of each object, in which the model uses M mixtures of continuous Gaussian probability distributions, the model has K states, and in which the duration N is substantially larger than the number of mixtures M times the number of states K, such that N>>M×K.

2. The method of claim 1, in which the model corresponds to a parameter space $\lambda$, the parameter space $\lambda$ being characterized by a set of parameters $\pi$, B, $\mu$, $\Sigma$ of the hidden Markov model, such that $\lambda=(\pi, B, \mu, \Sigma)$, were $\pi$ is a set of prior probabilities of states of the model, B is a set of state transition probabilities of the states, $\mu$ is a set of means of the sates, and $\Sigma$ is a set of covariance values of the states.

3. The method of claim 2, in which the K-states are $\{S_1, S_2, \ldots, S_K\}$, the set of prior probabilities is $\pi=\{\pi_i\}$, where $\pi_i=P(q_1=S_i)$ and $1 \leq i \leq K$, the set of state transition probabilities is $B=\{b_{ij}\}$, where $b_{ij}=P(q_{t+1}=S_j|q_t=S_i)$ and $1 \leq i, j \leq K$, and mean, variance and weights of the continuous Gaussian mixture probability distributions N ($O_t$, $\mu_j$, $\sigma_j$), where $\mu_j$, $\sigma_j$ are the mean and covariance of the continuous Gaussian probability distribution of a state j, and $q_t$ and $O_t$ are respectively the state and an observation at a time t.

4. The method of claim 3, further comprising:

determining a validity score to balance a likelihood and a complexity of the model according to $v=[-2 \log L(T; \lambda)+2\sigma]^{-1}$, where $L(T; \lambda)=P(T|\lambda)$ is a maximum likelihood, $\sigma$ is a constant balancing factor, and i=2, . . . , $K_{max}$ is the maximum number of states S.

5. The method of claim 4, further comprising:

selecting particular states to be incorporated in the model that yield highest validity scores.

6. The method of claim 1, in which the model has a left-to-right topology.

7. The method of claim 1, further comprising:

training the model with training trajectories.

8. The method of claim 1, further comprising:

constraining the model by forcing a substantial number of the transition probabilities to be zero.

9. The method of claim 1, in which a first trajectory is $T^a$ and a second trajectory is $T^b$, and their corresponding parameter spaces are $\lambda_a$ and $\lambda_b$, and a first similarity metric is $m_8(T^a, T^b)=|L(T^a; \lambda_a)+L(T^b; \lambda_b)-L(T^a; \lambda_b)-L(T^b; \lambda_a)|$, which corresponds to a cross-fitness of the models of the trajectories.

10. The method of claim 9, further comprising:

obtaining a sequence of orientations of each object.

11. The method of claim 10, in which the sequence of orientations is defined by $$\phi T(p_n) = \tan^{-1}((y_n - y_{n-1})/(x_n - x_{n-1})).$$

12. The method of claim 11, in which a second similarity metric is $$m_9(T^a, T^b) = m_8(\phi T^a, \phi T^b).$$

13. The method of claim 11, in which a third similarity metric is $$m_{10}(T^a, T^b) = m_8(\Delta T^a, \Delta T^b).$$

14. The method of claim 9, in which the first trajectory and the second trajectory have different durations.

15. The method of claim 9, in which the first trajectory and the second trajectory have different directions.

16. The method of claim 9, in which the first trajectory and the second trajectory are translated from each other.

17. The method of claim 9, in which the first trajectory and the second trajectory cross each other.

18. The method of claim 9, in which the first trajectory and the second trajectory circle in opposite directions.

19. The method of claim 9, in which the first trajectory and the second trajectory are shifted in phase.

20. The method of claim 9, in which the first trajectory and the second trajectory have different sampling rates.

21. The method of claim 1, further comprising:

obtaining a sequence of speeds of each object.

22. The method of claim 21, in which the sequence of speeds is defined by $$\Delta T(p_n) = [(x_n - x_{n-1})^2 + (y_n - y_{n-1})^2]^{1/2}.$$

* * * * *